(12) United States Patent
Fan

(10) Patent No.: US 8,074,050 B2
(45) Date of Patent: Dec. 6, 2011

(54) ELECTRONIC DEVICE AND ADDRESS SPACE EXPANSION METHOD

(75) Inventor: Chen-Huang Fan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 372 days.

(21) Appl. No.: 12/507,089

(22) Filed: Jul. 22, 2009

(65) Prior Publication Data

US 2010/0058028 A1      Mar. 4, 2010

(30) Foreign Application Priority Data

Aug. 29, 2008    (CN) .......................... 2008 1 0304319

(51) Int. Cl.
*G06F 13/00* (2006.01)
(52) U.S. Cl. ....................................... 711/217; 711/202
(58) Field of Classification Search .................. 711/202, 711/217
See application file for complete search history.

(56) References Cited

U.S. PATENT DOCUMENTS

| 6,938,103 | B2 * | 8/2005 | Azzarito et al. | 710/6 |
| 2002/0156977 | A1 * | 10/2002 | Derrick et al. | 711/118 |
| 2005/0246506 | A1 * | 11/2005 | Ukai | 711/152 |

* cited by examiner

*Primary Examiner* — Reba I Elmore
(74) *Attorney, Agent, or Firm* — Altis Law Group, Inc.

(57) ABSTRACT

An address space expansion method implemented by the electronic device which includes a storage unit, wherein the storage unit includes a first storage unit and a second storage unit, comprising: responding to the user operation to generate a target address; determining whether a address range of the target address is less than or equal to a predetermined address range, and generating a corresponding control signal; enabling the first storage unit or the second storage unit according to the generated corresponding control signal; acquiring a physical address corresponding to the target address and providing the physical address to the enabled storage unit according to the corresponding control signal and a predetermined converting rule; accessing and performing a reading/writing operation for data corresponding to the physical address of the enabled storage unit.

15 Claims, 2 Drawing Sheets

ELECTRONIC DEVICE AND ADDRESS SPACE EXPANSION METHOD

BACKGROUND

1. Technical Field

The disclosure relates to an electronic device and an address space expansion method for the device.

2. Description of Related Art

In general, a plurality of types of programs may have been stored in a storage unit of an electronic device, users can access programs from the storage unit via an access space whose capability is limited by a pin count of a (central processing unit) CPU. So, when numbers of the programs are quite large, and the capability of the access space is limited, some programs may not be accessed by the user via the access space.

Therefore, what is needed is an electronic device and an address space expansion method for accessing all programs.

DETAILED DESCRIPTION

Figure 1:
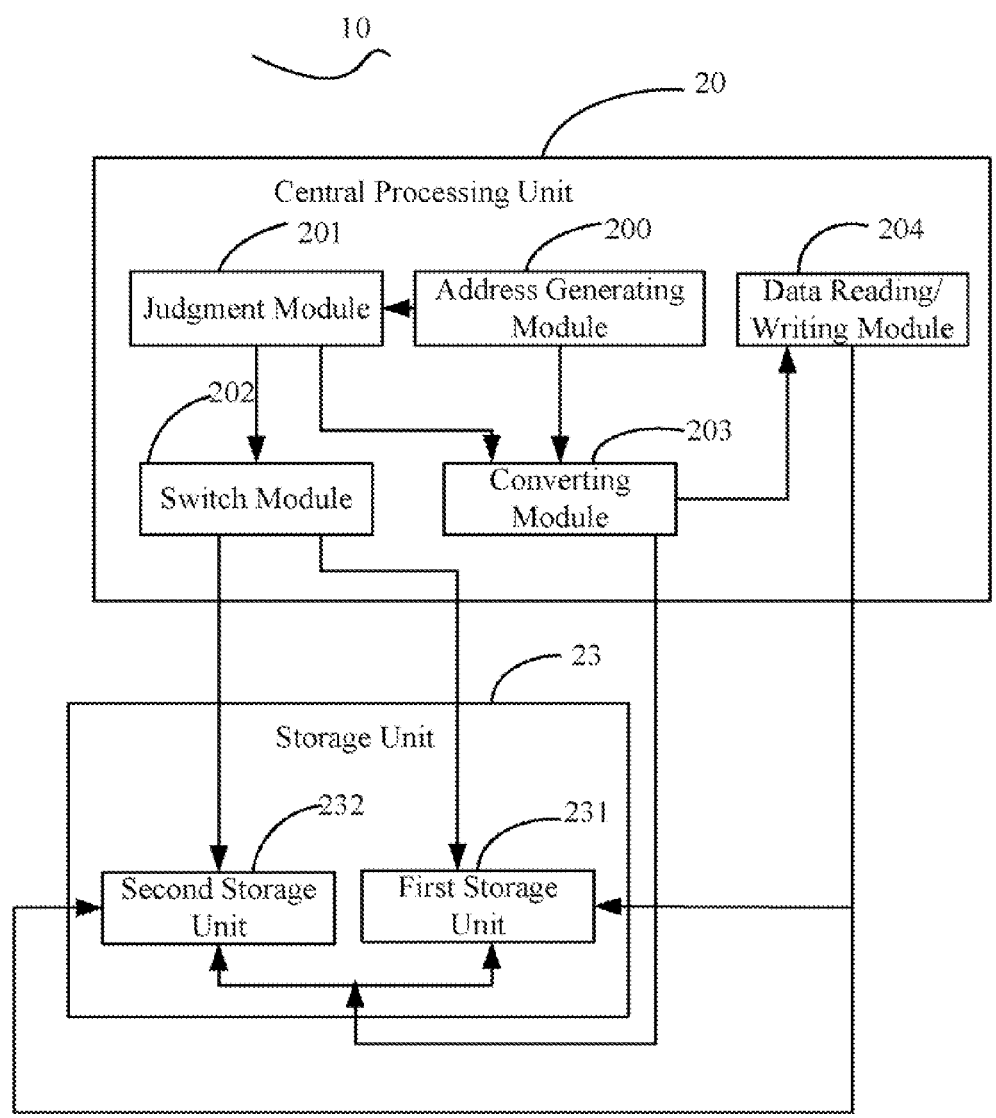
FIG. 1 is a block diagram of the hardware infrastructure of an electronic device in accordance with an exemplary embodiment.

FIG. 1 is a block diagram of the hardware infrastructure of an electronic device in accordance with an exemplary embodiment. The electronic device 10 includes a central processing unit (CPU) 20 and a storage unit 23. The CPU includes an address generating module 200, a judgment module 201, a switch module 202, a converting module 203, and a data reading/writing module 204. The storage unit 23 includes a first storage unit 231 and a second storage unit 232.

The address generating module 200 is configured to respond to a user operation to generate a target address. In the exemplary embodiment, the target is a virtual address, and has an address range. For example, the address range of the target address may be from 0000000 to 1FFFFFF.

The judgment module 201 is configured to judge whether the address range of the target address is less than or equal to a predetermined address range, and generate a corresponding control signal. In the exemplary embodiment, the judgment module 201 generates a first control signal if the address range of the target address is less than or equal to the predetermined address range; the judgment module 201 generates a second control signal if the address range of the target address is greater than the predetermined address range.

The switch module 202 is configured to enable the first storage unit 231 or the second storage unit 232 according to the corresponding control signal. In the exemplary embodiment, the switch module 202 enables the first storage unit 231, and disables the second storage unit 232 according to the first control signal; the switch module 202 enables the second storage unit 231, and disables the first storage unit 232 according to the second control signal.

The converting module 203 is configured to acquire a physical address according to the target address and a predetermined converting rule, and provide the physical address of the corresponding storage unit 23 to the data reading/writing module 204 according to the corresponding control signal. When the converting module 203 receives the first control signal, acquires a first physical address according to the target address and a first predetermined converting rule, and provides the first physical address to the first storage unit 231. When the converting module 203 receives the second control signal, acquires a second physical address according to the target address and a second predetermined converting rule, and provides the second physical address to the second storage unit 232.

The first predetermined converting rule and the second predetermined converting rule may be two mapping tables which have been stored in the converting module 203. The mapping table records a relationship between the target address and the physical address.

For better understanding the disclosure, an exemplary example is described in the following. Take the address range 0000000 to 3FFFFFF of the storage unit 23 for example. The storage unit is divided into the first storage unit 231 whose address range is from 0000000 to 1FFFFFF and the second storage unit whose address range is from 2000000 to 3FFFFFF. The first mapping table records the relationship between the target address range and the first physical address. The second first mapping table records the relationship between the target address and the second physical address. When the address range of the target address is less than or equal to 1FFFFFF, the judgment module 201 generates the first control signal. The switch module 202 enables the first storage unit 231 and disables the second storage unit 232 according to the first control signal. The converting module 203 acquires a first physical corresponding to the target address from the first mapping table. When the address range of the target address is greater than 2000000, the judgment module 201 generates the second control signal. The switch module 202 enables the second storage unit 231 and disables the first storage unit 232 according to the second control signal. The converting module 203 acquires a second physical corresponding to the target address from the second mapping table.

The data reading/writing module 204 is configured to access data corresponding to the physical address of the storage unit 23, and perform a reading/writing operation for the data.

Figure 2:
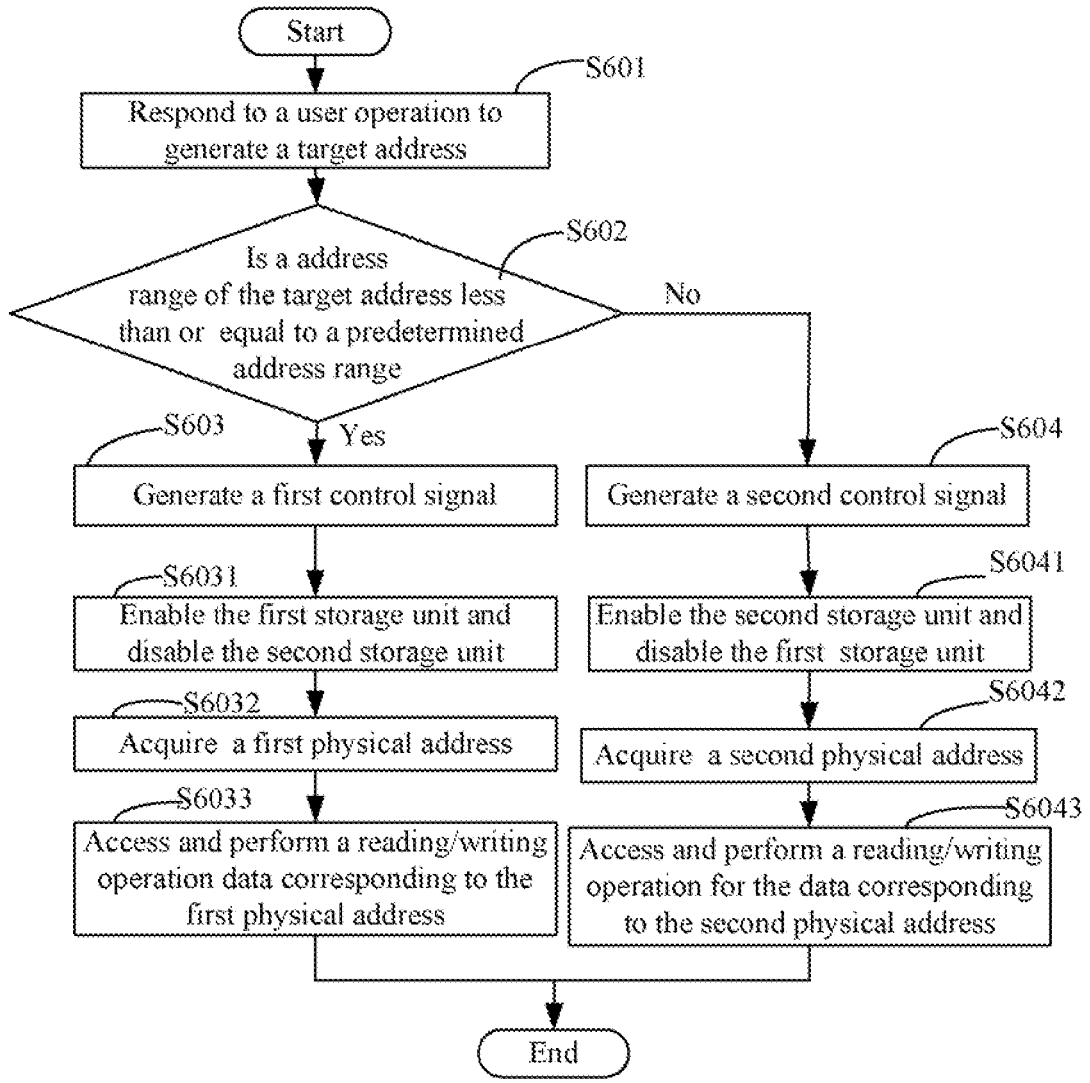
FIG. 2 is flowchart of a space expansion method implemented by the electronic device of FIG. 1 in accordance with an exemplary embodiment.

FIG. 2 is flowchart of an address space expansion method implemented by the electronic device of FIG. 1 in accordance with an exemplary embodiment.

In step S601, the address generating module 200 responds to the user operation to generate a target address.

In step S602, the judgment module 201 judges whether the address range of the target address is less than or equal to the predetermined address range, if so, the method continues to step S603. If not, the method returns to step S604.

In step S603, the judgment module 201 generates a first control signal if the address range of the target address is less than or equal to the predetermined address range.

In step S6031, the switch module 202 enables the first storage unit 231 and disables the second storage unit 232 according to the first control signal.

In step S6032, the converting module 20 acquires the first physical address corresponding to the target address according to the first control signal and the first predetermined converting rule, and provides the first physical address of the first storage unit 231 to the data reading/writing module 204.

In step S6033, the data reading/writing module 204 accesses a data corresponding to the first physical address of the first storage unit 231, and performs the reading/writing operation for the data.

In step S604, the judgment module 201 generates a second control signal if the address range of the target address is greater than the predetermined address range.

In step S6041, the switch module 202 enables the second storage unit 231 and disables the first storage unit 232 according to the second control signal.

In step S6042, the converting module 20 acquires a second physical address corresponding to the target address according to the target address and a second predetermined converting rule, and provides the second physical address of the second storage unit 231 to the data reading/writing module 204.

In step S6043, the data reading/writing module 204 accesses data corresponding to the second physical address of the second storage unit 232, and performs the reading/writing operation for the data.

Although the present disclosure has been specifically described on the basis of the one embodiment thereof, the disclosure is not to be construed as being limited thereto. Various changes or modifications may be made to the embodiment without departing from the scope and spirit of the disclosure.

What is claimed is:

1. An electronic device, comprising:
    a storage unit which comprises a first storage unit and a second storage unit; and
    a central processing unit (CPU) comprising:
        an address generating module configured to respond to a user operation to generate a target address including an address range;
        a judgment module configured to determine whether the address range of the target address is less than or equal to a predetermined address range, and generate a control signal;
        a switch module configured to enable the first storage unit or the second storage unit according to the generated control signal;
        a converting module configured to acquire a physical address corresponding to the target address and provide the physical address of the enabled storage unit according to the target address and a predetermined converting rule.

2. The electronic device as described in claim 1, wherein the CPU further comprises a data reading/writing module, which is configured to access and perform a reading/writing operation for data corresponding to the physical address of the enabled storage unit.

3. The electronic device as described in claim 2, wherein the judgment module is further configured to generate a first control signal if the address range of the target address is less than or equal to the predetermined address range; the judgment module is configured to generate a second control signal if the address range of the target address is greater than the predetermined address range.

4. The electronic device as described in claim 3, wherein the switch module is further configured to enable the first storage unit and disable the second storage unit according to the first control signal, and to enable the second storage unit and disable the first storage unit according to the second control signal.

5. The electronic device as described in claim 4, wherein the converting module is configured to acquire a first physical address corresponding to the target address and provide the first physical address of the first storage unit to the data reading/writing module, according to the first control signal and a first predetermined converting rule;
    the converting module is configured to acquire a second physical address corresponding to the target address and provide the second physical address of the second storage unit to the data reading/writing module, according to a second control signal and the second predetermined rule.

6. The electronic device as described in claim 5, wherein the first predetermined converting rule is a mapping table, which records a relationship between the target address and the first physical address.

7. The electronic device as described in claim 5, wherein the second predetermined converting rule is a mapping table, which records a relationship between the target address and the second physical address.

8. The electronic device as described in claim 1, wherein the target address is a virtual address.

9. An address space expansion method implemented by an electronic device which includes a storage unit, wherein the storage unit includes a first storage unit and a second storage unit, the method comprising:
    responding to the user operation to generate a target address;
    determining whether a address range of the target address is less than or equal to a predetermined address range, and generating a corresponding control signal;
    enabling the first storage unit or the second storage unit according to the generated corresponding control signal;
    acquiring a physical address corresponding to the target address and providing the physical address of the enabled storage unit according to the corresponding control signal and a predetermined converting rule.

10. The method as described in claim 9, further comprising:
    accessing and performing a reading/writing operation for data corresponding to the physical address of the enabled storage unit.

11. The method as described in claim 9, wherein the step of generating a corresponding control signal further comprises:
    generating a first control signal if the address range of the target address is less than or equal to the predetermined address range;
    generating a second control signal if the address range of the target address is greater than the predetermined address range.

12. The method as described in claim 11, wherein the enabling step further comprises:
    enabling the first storage unit and disabling the second storage unit according to the first control signal;
    enabling the second storage unit and disabling the first storage unit according to the second control signal.

13. The method as described in claim 12, wherein the acquiring step further comprises:
    acquiring a first physical address corresponding to the target address and providing the first physical address of the first storage unit according to the first control signal and a first predetermined converting rule;

acquiring a second physical address corresponding to the target address and providing the second physical address of the second storage unit according to the second control signal and a second predetermined converting rule.

14. The method as described in claim 13, wherein the first predetermined converting rule is a mapping table, which records a relationship between the target address and the first physical address.

15. The method as described in claim 13, wherein the second predetermined converting rule is a mapping table, which records a relationship between the target address and the second physical address.

* * * * *